Dec. 9, 1952    C. S. CLARK    2,621,092
PISTON
Filed Feb. 26, 1946
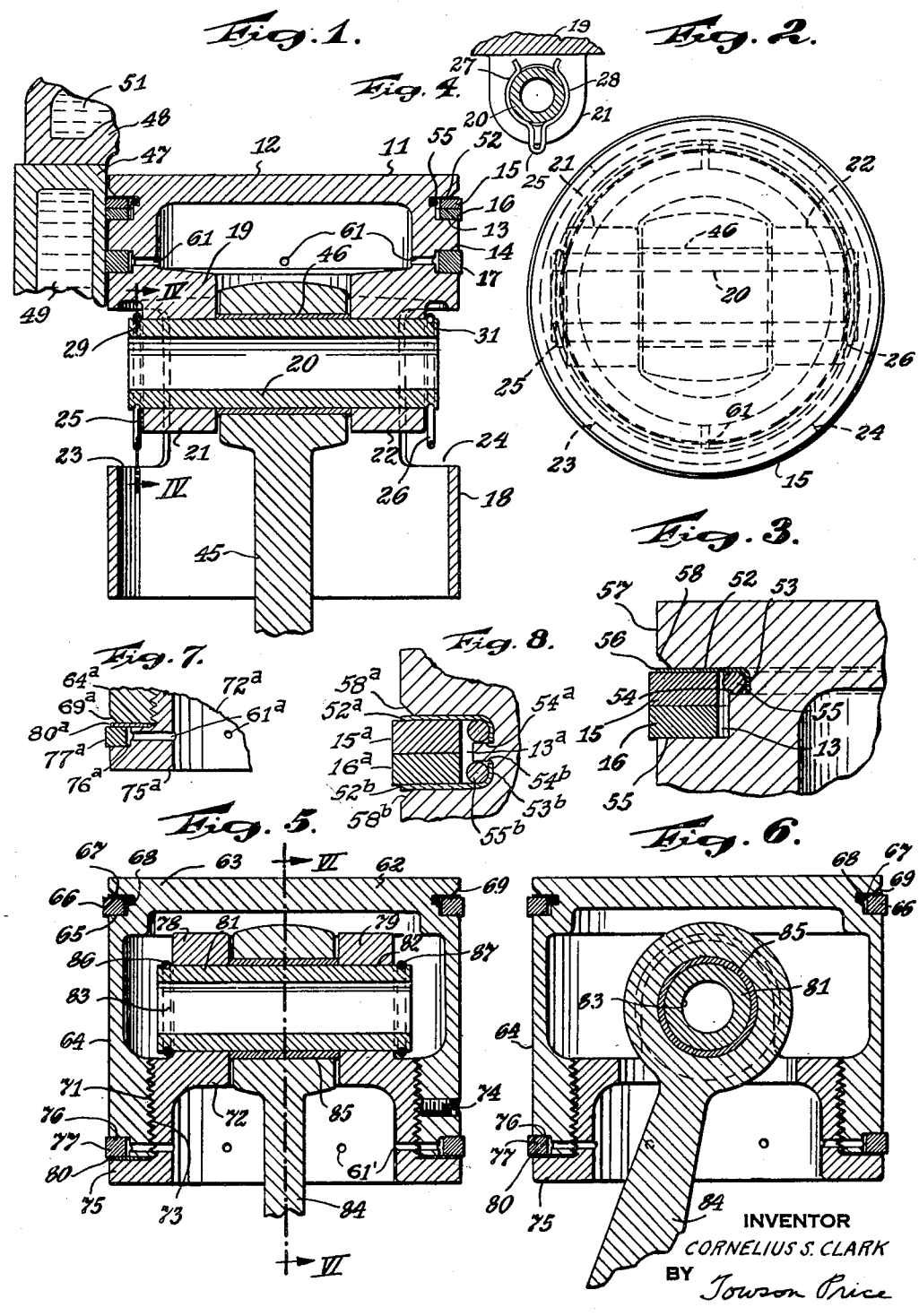
INVENTOR
CORNELIUS S. CLARK
BY Towson Price
ATTORNEY Patented Dec. 9, 1952

2,621,092

UNITED STATES PATENT OFFICE 2,621,092

PISTON

Cornelius S. Clark, Norfolk, Va.; Katie S. Clark, administratrix of said Cornelius S. Clark, deceased, assignor to Clark's Non-Blow-By Pistons, Inc., a corporation of Virginia Application February 26, 1946, Serial No. 650,177

10 Claims. (Cl. 309—19)

This application, a continuation in part of my application Ser. Nos. 363,855 and 413,259, filed respectively on November 1, 1940 and October 2, 1941, now Patents Nos. 2,395,847 and 2,396,084, respectively, relates to pistons and, more particularly, to such in which a sealing ring or diaphragm is provided for minimizing leakage between piston and cylinder.

The principal object of my invention, generally considered, is to construct a piston of improved design in which sealing means, additional to the ordinary piston rings, is provided for minimizing leakage between piston and cylinder, and where its length may be shortened by pivoting the associated connecting rod thereto near its head end, rather than near the skirt edge.

Another object of my invention is to provide a piston having a groove normally receiving an oil ring, with ports leading from said groove to the interior of the piston for feeding oil from the exterior piston surface past the wrist pin and back into the crank case of the engine.

A further object of my invention is the provision of a piston pivoted to a connecting rod by a wrist pin, with special wrist pin retainers for preventing longitudinal movement of said pin while allowing rotation thereof.

A still further object of my invention is the provision of a novel form of piston comprising a head with a skirt depending therefrom, a cap threaded or otherwise connected to said skirt and carrying wrist pin bosses normally near the piston head, and an outer or bottom flange on said cap defining a wall of a groove for holding an oil ring.

Other objects or advantages of the invention, relating to the particular arrangement and construction of the various parts, will become apparent as the description proceeds.

Referring to the drawings:

Figure 1 is an axial sectional view of a piston, associated rings and a wrist pin, embodying my invention, portions of the associated cylinder head, cylinder, and connecting rod being also shown.

Figure 2 is a plan view of the head end of the piston.

Figure 3 is an enlarged axial sectional view corresponding with the upper left-hand corner of the piston shown in Figure 1.

Figure 4 is an enlarged fragmentary sectional view on the line IV—IV of Figure 1, in the direction of the arrows.

Figure 5 is a view corresponding generally with Figure 1, but omitting the cylinder and cylinder head portion, and showing a modification.

Figure 6 is an axial sectional view on the line VI—VI of Figure 5, in the direction of the arrows.

Figure 7 is a fragmentary view corresponding to Figures 5 and 6, but showing another modification.

Fig. 8 is a view corresponding to Fig. 3, but showing a modification.

One of the problems in the construction of pistons, and especially those for internal combustion engines, is the loss of power due to leakage between the engaging wall of the cylinder and its piston. This is minimized by the employment of resilient piston rings in associated grooves in the cylindrical surface of the piston, which rings bear against the engaging cylindrical surface of the cylinder and tend to prevent leakage thereby. However, it has been found that leakage also occurs between the rings and their grooves, so that a serious loss of power results, especially after said rings have worn loose.

In my pending application, Serial No. 363,855, filed November 1, 1940, now Patent No. 2,395,847, I described and claimed a flexible sealing ring or diaphragm of thin metal disposed between the surface of the conventional piston ring toward the outer end surface of the piston head portion and the adjacent wall, defining the ring groove, so that cylinder pressure causes tight engagement between said thin metal ring and the adjacent conventional piston ring, thereby opposing pressure loss therebetween. The inner edge of said ring, being tightly embedded in a corresponding extension of the conventional piston ring groove, said ring is not only held in place but pressure loss therebeneath prevented.

In accordance with my present invention, I have improved on the construction of the sealing or diaphragm ring and its mode of connection to the piston, as well as provided other improvements, such as the disposition of the wrist pin in close proximity to the piston head, thereby making it possible to employ either a longer connecting rod, a shorter piston, or a smaller engine, in accordance with the improvement desired in the construction.

Referring to the drawings in detail, and first considering the embodiment of my invention illustrated in Figures 1 to 4 inclusive, the reference character 11 designates a piston embodying my invention, comprising a relatively thick head portion 12 formed, in the present instance, with a pair of peripheral grooves 13 and 14 for receiving piston ring means which may be either double, as indicated by the rings 15 and 16 in the groove 12, or single, as indicated by the ring 17 and the groove 14. The rings 15 and 16 may be considered as pressure rings, and the ring 17 as an oil ring, although they all, of course, function to minimize loss of pressure. A skirt portion 18 extends from the peripheral portion of the head 10 and is desirably formed relatively thin, as illustrated.

From that portion of the piston adjacent to the junction between the head and skirt portions extends an inwardly projecting annular flange 19, rigidifying the skirt portion and providing a base from which project, in the direction of the free edge of said skirt, bosses 21 and 22 providing bearings for a wrist pin 20 which passes therethrough and is shown hollow in the present embodiment. The skirt 18 is apertured, as indicated at 23 and 24, to permit insertion and removal of the wrist pin 20. After placing the pin, the same is desirably held against undesirable axial movement by means of special retainers 25 and 26, formed, as shown most clearly in Figure 4, generally like hairpins with intermediate portions bulged, as indicated at 27 and 28. These retainers are formed of a resilient material, such as spring steel wire, so that they may be snapped in place in wrist pin grooves 29 and 31. A connecting rod 45 is pivotally united to the wrist pin 20 with a bushing 46 disposed therebetween.

In order to minimize leakage along the surface between the piston 11 and the cylinder 47, the cylinder head being indicated at 48 and both formed hollow to receive cooling water indicated at 49 and 51, I may provide a sealing or diaphragm ring 52, shown most clearly in Fig. 3. This ring 52 is preferably formed of flexible material such as alloy steel, stainless steel, copper, brass, or the like, about .01 inch thick, with the inner peripheral portion bent axially to form a cylindrical flange 53 which will, when pushed into the groove 13, project away from the outer end surface of the piston head and in the same direction as, that is parallel to, the skirt 18 of the piston.

The sealing member 52 may be of such a size that, when clamped in place in the extension 54 of the ring groove 13, as by means of a wire 55 which may be formed of copper, holding the flange 53 against the bottom of the auxiliary groove 54, its outer edge 56 is flush with the outer cylindrical surface 57 of the piston 11. The ring 52 may be placed in position generally like a piston ring, as by being cut at one place to allow for entry, spiraled into the groove, and held in place by the wire 55, which may initially be slightly larger than the width of the groove extension 54 remaining after the ring 52 is positioned, and forced to the position shown in Figure 3 to hold the member 52 tightly in place. The ends of the ring 52 are desirably secured together by silver solder or other brazing material. However, in view of the gripping ring 55, tightly holding the flexible sealing ring 52 in place, it is not necessary to solder the ends of said sealing ring. Such a piston and sealing member combination is claimed in Patent No. 2,396,084.

The outer part of the head portion 12 is desirably beveled, as indicated at 58, to allow fluid from the outer portion of the cylinder to press against the outer surface of the ring 52 and hold it in tight sealing engagement with the ring 15. In this way leakage between piston and cylinder is minimized, as the rings 15 and 16 are forced together by pressure on the outer surface of said ring 52, minimizing loss of pressure between the annular outer surface of the ring 15 and the piston head, as well as between the inner cylindrical surface of the said ring and the groove 13.

Leakage between the rings 15 and 16 and the other surfaces is minimized because of the pressure exerted by the flexible sealing ring 52 on the rings 15 and 16 axially of the piston. Leakage between the piston head and the sealing ring 52 is minimized because the angular extension 53 of said sealing ring is pressed in a tight engagement with the bottom of the supplemental groove 54 by the gripping ring or retainer 55.

The ring 17 functions as an oil ring in one of the customary piston ring grooves 14, although, if desired, the ring construction and arrangement may correspond with that in the groove 13; that is, it may include a sealing member and retainer like the parts 52 and 55. This grooved portion is here provided with passages 61 extending to the interior of the piston for returning oil which gets by the ring 17 and feeding it to the wrist pin 20 and connecting rod 45, whether or not a sealing member and retainer are used.

Referring now to the embodiment of my invention illustrated in Figures 5 and 6, there is shown a piston 62 comprising a head portion 63 and a skirt portion 64. The head portion is, as in the preceding embodiment, formed with a groove 65 receiving piston ring means 66. Although said means is in the present embodiment formed as a single ring, it may, if desired, be two rings like those designated 15 and 16 of the preceding embodiment. The groove 65 may also receive a flexible sealing or diaphragm ring 67, desirably identical with the ring 52 of the preceding embodiment, and held in a supplemental groove or one extending from the head side of the groove 65, like the auxiliary groove 54 of the preceding embodiment, by a flexible wire 68, like that designated 55 in said first embodiment.

The head portion 63, defining the groove 65, is desirably beveled, as indicated at 69, for a reason similar to the beveling 58 of the first embodiment, so that the piston 62 is provided with sealing means identical with those of the piston 11.

In the present embodiment, however, the skirt portion 64 of the piston 62 is provided with threads, indicated at 71, and a cap or plug 72 is provided with cooperating threads 73, for uniting it thereto, as indicated. Any desired means may be provided, such as a cotter pin or screw 74, for preventing the cap 72 from unintentionally becoming loosened from the skirt 64. The cap 72 desirably has an outer flange 75 which, when the parts are assembled, defines the outer or lower wall of a groove 76, formed by notching the outer edge of the skirt 64 to receive the ring or rings 77, which may function as an oil seal, like the ring 17 of the first embodiment, or may be additional to a ring like 17 of the first embodiment. The grooved portion is here provided with passages 61' extending to the interior of the piston for returning oil which gets by the sealing ring and/or piston ring. A gasket or sealing ring 80 may be secured between the cap flange 79 and the skirt 64, like the sealing ring 71 of my application Serial No. 363,855, previously referred to.

Referring now to the embodiment of my invention illustrated in Fig. 7, there is shown a fragmentary portion of the skirt 64ª of a piston generally like that illustrated in Figs. 5 and 6, to which is threadably connected a cap or plug 72ª, generally like the cap 72 of said preceding embodiment, except that the flange portion 75ª is notched, as indicated at 76ª to receive a piston ring 77ª. A gasket device 80ª is desirably clamped between the piston ring 77ª and the skirt end surface, when the parts are assembled as illustrated. Said device 80ª may correspond with that designated 80 in the preceding embodiment, except that it engages the head surface of the piston ring, rather than the other end surface thereof. It is desirably a diaphragm ring, like the ring 71 of my application, Ser. No. 363,855, previously referred to, so that it functions like a second sealing device, or one supplementing that designated 52 in Figs. 1 and 3, and 67 in Figs. 5 and 6.

The grooved portion of the cap 72ª is, like the skirt portion of the piston in Figs. 5 and 6, provided with passages 61ª, corresponding with the passages 61' of Figs. 5 and 6, and running to the interior of the piston, for returning oil, which gets by the ring 77ª, to the crank case or oil reservoir. The skirt portion 64ª may be beveled, as indicated at 69ª, to correspond with the bevel at the head ring, as designated 69 in Figs. 5 and 6. It will, therefore, be seen that the flexible sealing ring 80ª functions like the sealing ring 67 to reduce pressure loss past the piston ring while, at the same time, not interfering with the functioning of the ring 77ª as an oil ring in the return of the oil to the reservoir. Except as specifically disclosed, the embodiment of Fig. 7 may correspond with that of Figs. 5 and 6.

The inner portion of the cap 72 and that of the cap 72ª is provided with bosses 78 and 79, apertured as indicated at 81 and 82, to provide bearings for receiving the hollow wrist pin 83. Said wrist pin, as in the preceding embodiment, may, after assembly with said portions and the connecting rod 84 and bushing 85, be held against axial movement by retainers 86 and 87, such as those designated 25 and 26 in the first embodiment.

It will, therefore, be seen that a piston is provided in which the wrist pin 83 is much closer to the head than in conventional construction. It will also be seen that application of the piston rings 77 and 77ª is facilitated by making the grooves receiving the same each in two parts, completed upon assembly of the piston head and skirt, with a cap functioning as a wrist pin carrier and comprising bearings holding the wrist pin.

From the foregoing disclosure, it will be seen that I have provided a piston which is not only improved from the standpoint of minimizing pressure loss but also with regard to the disposition of the wrist pin, whereby it is possible, if desired, to economize by decreasing the size of the engine without loss of power or other undesirable results.

It will also be understood that, whereas in one instance I have shown a pair of rings in a groove and in other instances only one ring in each groove, it is contemplated to use one or a plurality of rings in any groove, as may be desired in a given case. As an alternative, as illustrated in Fig. 8, I may provide sealing members 52ª and 52ᵇ; on both sides of piston rings 15ª and 16ª, or a single ring if used instead; on both sides of said rings and the ring 17; on both sides of the ring 66; or such a sealing member on the side of the ring 77 or 77ª opposite the sealing member 80 or 80ª. Such a construction would be particularly suitable for double-acting pistons. In other words, the ring groove 13ª of Fig. 8, for example, instead of being formed with an auxiliary or supplemental groove 54ª at only the head side thereof, would also be formed with a similar groove 54ᵇ at the other or skirt side thereof, and a sealing or diaphragm ring 52ᵇ would be fitted in said auxiliary groove, exactly like the ring 52 is fitted in the groove extension 54, as illustrated in Fig. 3, except that its cylindrical flange 53ᵇ would project toward the head end of the piston instead of in the opposite direction.

The retainer member or wire 55ᵇ for the second sealing ring would be like the wire 55, except that it would be forced into the second auxiliary groove or extension and push the second sealing ring against the side of the groove opposite to that engaged by the ring 52ª. The edge of the groove at said second sealing ring would then preferably be beveled at 58ᵇ, corresponding with the bevel 58ª. Such a construction would allow for especially good sealing against pressure loss, particularly in a double-acting piston where the pressure is applied alternately to opposite sides thereof, although it would be useful in even a single-acting piston as additional sealing means against pressure loss, acting in effect as sealing bushings or gaskets on both sides of the piston ring, rather than only one side, whereby increased efficiency is obtainable.

Of course, the clearances between the piston ring and the sealing rings or gaskets would be in accordance with conventional practice. Although the detailed description has been directed particularly to the construction in the groove 13, it will be understood that the additional sealing member construction, if used in grooves 14, 65, 76 and/or 76ª, would be identical with that for groove 13.

Although preferred embodiments of my invention have been disclosed, it will be understood that modifications may be made within the spirit and scope of the invention, as defined by the appended claims.

I claim:

1. In combination in a piston, a head and a skirt portion, a cap portion comprising wrist pin bearing portions and secured to said skirt portion, said piston being formed with a groove defined by said skirt and cap portions, a piston ring in said groove, and a flexible sealing member of thin material secured in said groove between the said ring and the adjacent groove wall, and with its inner edge portions clamped between said cap and skirt portions to minimize pressure loss by the said piston ring and groove.

2. A piston comprising head and skirt portions, a cap secured to the skirt portion, remote from the head portion, around its full periphery, and bosses projecting from said cap toward the head portion, said bosses being apertured to provide wrist pin bearings disposed close to said head portion.

3. In combination, a piston comprising head and skirt portions, said skirt portion being provided with interior threads and a cap formed with exterior threads corresponding with the skirt threads to provide for connection therebetween, said cap having bosses projecting beyond said threaded portions, so that when connected to the skirt portion of the piston they are disposed close to the head portion, said bosses being apertured for the reception of a wrist pin.

4. In combination, a piston comprising head and skirt portions, said skirt portion being provided with interior threads, a cap formed with exterior threads corresponding with the skirt threads to provide for connection therebetween, said cap having an outstanding flange, said piston being formed with a groove defined by said skirt and flange, a piston ring in said groove, and a flexible sealing ring clamped between said flange and the end of said skirt portion.

5. In combination, a piston with a head and a groove, piston ring means in said groove, said groove being formed with a supplemental portion at the head side thereof, a piston ring in said groove, a sealing ring received in said supplemental portion, engaging said piston ring, and having an axial projection, means engaging said axial projection and holding said sealing ring in place in said supplemental portion, a second groove spaced away from the piston head and from said first-mentioned groove, a piston ring in said groove, said groove being also formed with a supplemental portion at a side toward the head, a sealing ring received in said supplemental portion, engaging said piston ring and having an axial projection, and means engaging said projection and holding said sealing ring in place in said supplemental portion, said groove also provided with apertures for feeding oil which leaks past the second piston ring and letting it drain toward the center of the piston.

6. In combination, a piston with a head and a groove therein, piston ring means in said groove, said groove being formed with supplemental portions, one at each side thereof, a piston ring in said groove, a sealing ring in each supplemental portion, engaging said piston ring at each side and having a generally-cylindrical flange received in a supplemental groove portion projecting away from the engaged surface of the groove, and means engaging each projection and holding said sealing rings in said supplemental portions.

7. In combination in a piston, a head and a skirt portion, a cap portion secured to said skirt portion, said piston being formed with a groove adjacent its head, a piston ring in said groove, a flexible sealing ring of thin metal disposed between the surface of said piston ring toward the outer end surface of said head and the adjacent wall of said groove, the inner portion of said sealing ring terminating in a generally-cylindrical flange projecting away from the piston head, means encircling said flange to hold said sealing ring in the bottom of said groove, said piston also being formed with a groove defined by its skirt and the cap portion, a piston ring in said groove, and a flexible sealing member of thin metal in said groove between said ring and the adjacent wall, with its inner edge portion clamped between said cap and skirt, to assist the first-mentioned sealing member to minimize pressure losses, the skirt and cap portions being formed with registering apertures for feeding the oil which gets by said second-mentioned ring toward the inner portion of the piston.

8. In combination in a piston, a head and a skirt portion, a cap portion comprising wrist pin bearing portions and secured to said skirt portion, said cap portion being formed with a groove, the adjacent surface of the piston skirt defining one side of said groove, a piston ring in said groove, and a flexible sealing member of thin metal secured in said groove between the said ring and the adjacent surface of the piston skirt forming a groove wall, and with its interior edge portion clamped between said cap and skirt to minimize pressure loss, said cap being formed with apertures leading inward from the bottom of said groove, to allow the piston ring to perform the additional function of an oil ring, whereby oil leaking thereby feeds from the groove to the interior of said cap.

9. In combination, a piston with a head and a groove therein, piston ring means in said groove, said groove being formed with supplemental portions, one at each side thereof, a piston ring in said groove, a sealing ring in each supplemental portion, engaging said piston ring at each side, and means separate from said sealing rings for holding them in said supplemental portions.

10. In combination in a piston, a head and a skirt portion, a cap portion secured to said skirt portion, said piston being formed with a groove adjacent its head, a piston ring in said groove, a flexible sealing ring of thin metal disposed between the surface of said piston ring toward the outer end surface of said head and the adjacent wall of said groove, said piston also being formed with a groove defined by its skirt and the cap portion, a piston ring in said groove, and a flexible sealing member of thin metal in said groove between said ring and the adjacent wall of said cap, with its inner edge portion clamped between said cap and skirt, to assist the first-mentioned sealing member to minimize pressure losses, the skirt and cap portions being formed with registering apertures for feeding the oil which gets by said second-mentioned ring toward the inner portion of the piston.

CORNELIUS S. CLARK.

REFERENCES CITED

The following references are of record in the file of this patent:

UNITED STATES PATENTS

| Number | Name | Date |
| --- | --- | --- |
| Re. 18,144 | Heiermann | Aug. 4, 1931 |
| 1,394,898 | Harriman | Oct. 25, 1921 |
| 1,518,986 | Kruse | Dec. 9, 1924 |
| 1,554,475 | Wendell et al. | Sept. 22, 1925 |
| 1,781,183 | Lewis et al. | Nov. 11, 1930 |
| 1,830,937 | Falkenstein | Nov. 10, 1931 |
| 1,999,233 | Fall | Apr. 30, 1935 |
| 2,056,079 | Ramspeck | Sept. 29, 1936 |
| 2,213,884 | Ohmart | Sept. 3, 1940 |
| 2,321,791 | Beardsley | June 15, 1943 |
| 2,384,305 | Herron | Sept. 4, 1945 |
| 2,388,363 | Moore | Nov. 6, 1945 |
| 2,394,408 | Starr | Feb. 5, 1946 |
| 2,395,847 | Clark | Mar. 5, 1946 |
| 2,396,084 | Clark | Mar. 5, 1946 |
| 2,415,984 | Ballard | Feb. 18, 1947 |

FOREIGN PATENTS

| Number | Country | Date |
| --- | --- | --- |
| 487,709 | Germany | July 3, 1925 |
| 525,968 | Germany | May 30, 1931 |